United States Patent [19]

Lukacs, III et al.

[11] Patent Number: 5,240,658
[45] Date of Patent: Aug. 31, 1993

[54] REACTION INJECTION MOLDING OF SILICON NITRIDE CERAMICS HAVING CRYSTALLIZED GRAIN BOUNDARY PHASES

[76] Inventors: Alexander Lukacs, III, 5 Marklyn Ct., Brandywood, Wilmington, Del. 19810; Roger L. K. Matsumoto, 2 Ranch Ct., Paper Mill Farms, Newark, Del. 19711

[21] Appl. No.: 851,038

[22] Filed: Mar. 10, 1992

Related U.S. Application Data

[63] Continuation-in-part of Ser. No. 675,010, Mar. 26, 1991, abandoned.

[51] Int. Cl.$^5$ .................................................. C04B 35/58
[52] U.S. Cl. ............................................. 264/63; 264/65; 264/328.2
[58] Field of Search ........................... 264/65, 328.2, 63

[56] References Cited

U.S. PATENT DOCUMENTS

| | | | |
|---|---|---|---|
| 3,719,630 | 3/1973 | Autonen | 260/37 |
| 3,853,567 | 12/1974 | Verbeek | 106/44 |
| 3,892,583 | 7/1975 | Winter et al. | 106/55 |
| 4,264,550 | 4/1981 | Ezis | 264/85 |
| 4,482,669 | 11/1984 | Seyferth et al. | 524/442 |
| 4,560,526 | 12/1985 | Okamura | 264/328.2 |
| 4,627,945 | 12/1986 | Winkelbauer et al. | 264/29.5 |
| 4,650,837 | 3/1987 | Seyferth et al. | 525/478 |
| 4,689,252 | 8/1987 | Lebrun et al. | 427/228 |
| 4,720,532 | 1/1988 | Seyferth et al. | 528/28 |
| 4,722,988 | 2/1988 | Porte et al. | 528/28 |
| 4,761,389 | 8/1988 | Rabe et al. | 501/95 |
| 4,772,494 | 9/1988 | Porte et al. | 427/374.7 |
| 4,939,197 | 7/1990 | Su | 524/300 |
| 5,094,986 | 3/1992 | Matsumoto et al. | 501/97 |

FOREIGN PATENT DOCUMENTS

| | | |
|---|---|---|
| 3007384 | 9/1980 | Fed. Rep. of Germany . |
| 63-201058 | 8/1988 | Japan . |
| WO88/07505 | 10/1988 | PCT Int'l Appl. . |

Primary Examiner—James Derrington

[57] ABSTRACT

A sintered, $Si_3N_4$-containing ceramic article is prepared by a reaction injection molding process comprising (1) injecting into a heated mold a fluid, nondilatant mixture of (a) at least 40% by volume of a powder mixture of (i) $Si_3N_4$, (ii) a silicate glass-forming sintering aid and (iii) a high metal content silicide, and (b) a curable $Si_3N_4$ precursor binder, to cure the binder and produce a hardened molded article, and (2) heating the molded article under a suitable atmosphere to convert the cured binder to a $Si_3N_4$-containing ceramic. The molded article is then sintered under a vacuum to crystallize the silicate glass phase by deoxygenation.

15 Claims, No Drawings

REACTION INJECTION MOLDING OF SILICON NITRIDE CERAMICS HAVING CRYSTALLIZED GRAIN BOUNDARY PHASES

This application is a continuation-in-part of Ser. No. 07/675,010 filed Mar. 26, 1991, now abandoned.

FIELD OF THE INVENTION

This invention relates to reaction injection molding of ceramics.

BACKGROUND OF THE INVENTION

In view of the problems associated with prior techniques such as dry or wet pressing and slip casting, thermoplastic injection molding has been increasingly used to form ceramic articles. Greenbodies prepared in this manner show much improved green strength. The process involves forming a ceramic greenbody by injecting into a mold a mixture of ceramic powder dispersed in a thermoplastic polymer that is held at a temperature above the softening point of the polymer. The mold is held at a temperature below the softening point of the polymer to solidify the mixture of powder and polymer in the mold. A typical ceramic powder/thermoplastic polymer mixture has a very high content of ceramic particles, typically from about 50 to about 87 volume %, and a minimum of the binder material.

The part is then removed from the mold and placed in a furnace to burn out the binder. The molded article is heated very slowly through the decomposition temperature of the polymer, e.g., at 10° C./hour. The very slow heating is required to prevent deformation or "slumping" of the molded article once the furnace temperature exceeds the softening temperature of the polymer. Often, external physical support is needed to prevent slumping during the binder burnout step. Following the binder burnout step, the resulting porous greenbody is sintered, with concurrent shrinkage, to a dense ceramic part with the same shape as the molded object.

The use of an organic thermosetting resin as the binder for the ceramic particles has also been suggested. For example, U.S. Pat. No. 4,627,945 discloses injection molding of compositions that are cured in the mold by the addition of a curing agent to a mixture of ceramic powder and thermosetting phenolic resin binder. Thermoset molding has an advantage over conventional thermoplastic molding in that the greenbody is not prone to "slump" during the sintering process, since the thermoset binder, once cured, no longer has a softening point. The thermoset organic binder must, however, still be completely burned out of the molded article prior to the sintering step.

Reaction injection molding (RIM) has also been adapted for forming shaped ceramic greenbodies. U.S. Pat. No. 4,906,424 discloses a RIM process for molding a mix of ceramic powder and a polymerizable, low viscosity, multifunctional organic acrylate monomer or mixtures of monomers. The ceramic-monomer mixes are formulated to be highly filled, i.e., greater than 50 vol. %, with ceramic powder, yet have adequate fluidity to be processed at ambient temperature and readily injected into a hot mold. Useful monomers are those that are liquid at room temperature and can be polymerized to irreversibly solidify the fluid composition in the mold. The part is then ejected from the mold and subjected to subsequent post-curing, binder removal, sintering and, if needed, machining to produce a dense ceramic part.

However, organic binders such as polyacrylates must be burned out of the molded part in the process of converting the part to a dense, sintered ceramic article. The carbon-containing char that would otherwise remain in the sintered body would have a deleterious effect on the structural integrity and high temperature performance of the sintered part. Often, the carbon in the binders previously disclosed for RIM processes cannot be completely eliminated in the firing step. In addition, removal of an organic binder can cause structural defects in a sintered part due to voids formed from the rapid generation of volatile materials in the binder burnout step. A further complication arises in fabricating sintered parts of well-defined dimensions. Excessive shrinkage occurs when a high fraction of a ceramic greenbody must be removed in a binder burnout step. When the part finally densifies at high temperatures, dimensional distortion can be extreme, requiring a complex mold design.

Binder systems that contribute to the ceramic body ("non-fugitive" binders) have been used in traditional molding methods, although not in RIM processes. For example, U.S. Pat. Nos. 4,689,252; 4,722,988 and 4,772,494 disclose a crosslinkable silazane polymer that can be cured and subsequently pyrolyzed to convert the polysilazane to a silicon nitride-containing ceramic material. The silazane polymer can be used for coating or impregnating a substrate, making silicon nitride-containing ceramic fibers or as a sinterable binder for ceramic powders.

The use of silicon nitride ceramics in a number of high temperature structural applications has been proposed. The advantages of this material in such applications include its higher relative flexural strength and fracture toughness at elevated temperatures. Unfortunately, since silicon nitride is a mostly covalently bonded ceramic, it is difficult to densify fully in its pure state, regardless of whether the unsintered silicon nitride is in the form of a powder compact or the char that is formed by pyrolysis of a silicon nitride ceramic precursor. Additives are necessary to promote a glassy silicate grain boundary phase that aids in densification. It is the presence of the glassy silicate phase that limits the performance of silicon nitride at high temperatures. This glassy phase softens and melts with catastrophic effects on the mechanical properties of the ceramic.

One method for eliminating this glassy phase is described in U.S. Pat. No. 4,264,550, where a mixture of silicon nitride powder containing $SiO_2$ as an oxide surface coating and $Y_2O_3$ powder is heated to 1000° to 1400° C. under a pressure of at least 2000 psi to permit a nucleating reaction to take place. The mixture is then heated to a temperature of 1680° to 1750° C. under pressure. The resulting pressed body is claimed to contain fully crystallized grain boundary phases of $Si_3N_4$, $SiO_2$, $Y_2O_3$.

Various silicon nitride compositions containing metal silicides have been disclosed. For example, U.S. Pat. No. 5 4,407,971 discloses a sintered ceramic body comprising yttrium oxide, aluminum oxide, aluminum nitride and 0.1 to 5% by weight of at least one silicide of Mg, Ca, Ti, V, Cr, Mn, Zr, Nb, Mo, Ta and W. U.S. Pat. No. 4,612,296 discloses a high toughness silicon nitride sintered body containing at least one silicide or carbide of Ti, Zr, Hf, V, Nb, Ta, Cr, Mo and W. U.S. Pat. No. 4,983,554 discloses a sintered silicon nitride ceramic containing aluminum nitride, yttrium oxide, and molybdenum disilicide. U.S. Pat. No. 5,023,214 discloses a sintered $Si_3N_4$ product containing a sintering aid and 1 to 80% of a silicide of Fe, Ni or Co. U.S. Ser. No. 07/592,713 filed Oct. 4, 1990, discloses a process for preparing a sintered silicon nitride ceramic containing 2% to 6% of a silicide of Fe, Ni or Co, at least 50% of which is a high metal content silicide.

The prior art does not teach a method for (1) rapidly injection molding a high solids, nondilatant dispersion of silicon nitride, a silicate glass-forming sintering aid, and a high metal content transition metal silicide in a curable, liquid silicon nitride ceramic precursor binder at a low temperature, (2) subsequently curing the precursor and (3) sintering the molded article with concomitant conversion of the ceramic precursor binder to a ceramic containing crystallized grain boundary phases.

SUMMARY OF THE INVENTION

The reaction injection molding process of this invention for preparing a sintered, silicon nitride-containing ceramic article comprises (1) injecting into a heated mold a fluid, nondilatant mixture comprising (a) at least 40% by volume of a powder mixture of (i) from about 20 wt. % to about 98 wt. % silicon nitride, (ii) from about 0.5 wt. % to about 20 wt. % of a silicate glass-forming sintering aid, and (iii) from about 0.001 wt. % to about 80 wt. % of a high metal content transition metal silicide or a transition metal or metal compound that forms a high metal content silicide with silicon nitride under the conditions defined in step (2) or (3), and (b) a curable silicon nitride precursor binder that is a liquid below its curing temperature, to cure the binder and produce a hardened molded article, (2) heating the hardened molded article under a suitable atmosphere to a temperature sufficient to convert the cured binder to a silicon nitride-containing ceramic, and (3) sintering the article by (i) heating at a temperature of 1300° to 1800° C. until a silicate g)ass forms, and (ii) further heating at a temperature of 1300° to 1800° C. under a vacuum until oxygen is removed from the silicate glass and the glass crystallizes.

DETAILED DESCRIPTION OF THE INVENTION

The silicon nitride precursor binder used in the process of this invention must exhibit very specific rheological and chemical behavior. The silicon nitride precursor binder must be a liquid at temperatures below its curing temperature and have the properties discussed below in order to be useful in the reaction injection molding process of this invention.

The binder should preferably cure rapidly by thermal, radical or ionic means. The term "cure" is defined as a chemical polymerization or crosslinking process that leads to thermally irreversible binder solidification to the extent necessary to remove a powder-filled green part from a mold without dimensional distortion. There is an increase in binder molecular weight during curing, with formation of covalent bonds and rapid propagation of bond formation such that the cure is accomplished in less than 60 minutes and preferably less than 10 minutes. Rapid cure mechanisms such as those involving radical propagation are thus preferred.

The silicon nitride precursor binders preferably have a viscosity of less than 2000 cp, more preferably less than 100 cp, and most preferably between 50 and 1 cp at 25° C. The viscosity of the binder must not increase appreciably over the range of temperatures at which the injection molding is conducted. This is usually not a problem, since molding mixes are injected at relatively low temperatures in a RIM process, i.e., generally less than 80° C. and certainly less than 120° C. This requirement limits suitable binders to those that do not exhibit appreciable molecular weight increase at temperatures between 25° and about 120° C. However, molecular weight buildup during injection molding is seldom a problem if room temperature viscosities fall within the ranges defined.

The silicon nitride precursor binders preferably have a polydispersity less than or equal to three, preferably less than or equal to two. Polydispersity is defined as the ratio of the polymer weight average molecular weight to the polymer number average molecular weight. Polymers or oligomers having a higher polydispersity exhibit complex rheological behavior and often show shear thickening (dilatant) behavior when highly filled (greater than 40% by weight) with a ceramic powder. Such polymers, when filled, are therefore unsuitable for injection molding because the mixtures will not flow easily when sheared. In contrast, the highly filled silicon nitride precursor polymers or oligomers of this invention exhibit nondilatant behavior, even without heating.

After curing, the silicon nitride precursor should preferably contain no more than 10 wt. %, more preferably no more than 5 wt. %, of species that volatilize below the decomposition temperature of the cured binder. Extensive voids are created if a higher percentage of volatile species is present, leading to unacceptable porosity and increased shrinkage in the fired article.

The silicon nitride precursor binder should preferably form a coherent char upon decomposition and at temperatures less than the sintering temperature of the filler.

While monomeric binders can satisfy all of the requirements mentioned above, monomers that polymerize to form binder polymers of appreciable ceramic yield (greater than 60 wt. %) often have so low a molecular weight that volatilization at modest molding temperatures becomes a problem. One example is bis(methylamino)methylvinylsilane, which has a boiling point of only 135° C. Curing this monomer by thermal or radical means to form a solidified binder requires temperatures greater than the boiling point of the monomer. It is thus unsuitable in the RIM process described. Because monomers are generally too volatile to be used in this RIM process, the preferred silicon nitride precursors of this invention are either oligomeric or polymeric. An oligomer is defined as a polymer molecule consisting of only a few monomer repeat units, i.e., greater than two and generally less than 30. When the silicon nitride precursor used in the practice of this invention is an oligomer or a polymer, the synthesis of the precursor is controlled in order to produce a low molecular weight product that exhibits the requisite rheological characteristics. In general, polymers suitable for the practice of this invention have numbers of repeat units of less than about 200. While it is not the object of this invention to teach the exact synthetic conditions necessary for all families of oligomeric and polymeric silicon nitride precursors suitable for the practice of this invention, in the case of polysilazanes made by ammonolysis of chlorosilanes, control of the synthesis is accomplished by using a low reaction temperature. Alternatively, molecular weights can be kept low by using a more polar solvent when the ammonolysis is performed at higher temperatures. Exact synthetic conditions for preparing suitable silicon nitride precursor oligomers or polymers are dependent on the desired chemical composition of the polymer being prepared and are readily apparent to one skilled in the art.

Suitable silicon nitride precursors for the practice of this invention include, for example, polysilazanes, polyureasilazanes, and polythioureasilazanes. Suitable precursors of this sort may contain alkenyl, alkynyl, epoxy, acrylate or methacrylate substitution. Specific examples include poly(methylvinyl)silazane, 1,3,5-trimethyl- 1,3,5-trivinyltrisilazane, and 1,3,5,7-tetramethyl-1,3,5,7- tetravinyltetrasilazane.

The silicon nitride powder used in the practice of this invention can be any commercially available silicon nitride powder. The silicon nitride is used in an amount of from about 20% to about 98% based on the total weight of the powder mixture.

The powder mixture also includes from about 0.5% to about 20% based on the total weight of the powder mixture, of a silicate glass-forming sintering aid. The amount of sintering aid used must be sufficient to densify the ceramic to the degree desired and also depends upon which silicide is used and how much is used. The amount of sintering aid required can readily be determined by one skilled in the art. The sintering aid is selected from the group consisting of oxides, nitrides or silicates of elements of IUPAC groups 2, 3, 4, 13 or the lanthanide series, or mixtures thereof. A combination of aluminum oxide and yttrium oxide is preferred. The silicate sintering aid can be added as a powder or can be formed in situ by the reaction of an oxide or nitride sintering aid with the silica that is inherently present on the surface of the silicon nitride powder. When a nitride sintering aid is used, it is sometimes desirable to add silica in addition to that which is inherently present on the surface of the silicon nitride.

The transition metal silicides suitable for use in the process of this invention include yttrium and the rare earths (lanthanum and the lanthanides), titanium, zirconium, hafnium, manganese, rhenium, vanadium, niobium, tantalum, chromium, molybdenum, tungsten, iron, ruthenium, osmium, cobalt, rhodium, iridium, nickel, palladium, platinum and copper. Some of these metals form high temperature-stable nitrides or carbides as well as silicides, which can diminish the effectiveness of these metal silicides in the practice of the invention. The preferred transition metals are therefore iron, ruthenium, osmium, cobalt, rhodium, iridium, nickel, palladium and platinum. Cobalt, rhodium and iridium are most preferred.

The high metal content transition metal silicides can be formed in situ by reaction of the metal or its oxide, chloride, nitrate or other compound with the silicon nitride during sintering, or they can be added as preformed particulates. High metal content silicides are defined as those in which the ratio of metal to silicon is equal to or greater than 1. It is normally not possible to form the high metal content silicide from low metal content silicides. For example, $CoSi_2$ added to silicon nitride does not result in the formation of the desired high metal content $Co_2Si$ phase. Low metal content silicides are not suitable for use in the process of this invention because of their oxidation behavior in the presence of Si—O bonds (see for example, G. R. Castro, J. E. Hulse and J. Kuppers, Applied Surface Science, 27 (1986) 262-274).

The amount of silicide present is from 0.001% to about 80% based on the total weight of the powder mixture. If a glass-free ceramic comprising an extremely high percentage of silicon nitride is desired, e.g., 90 to 80 wt. % $Si_3N_4$, catalytic amounts of the silicide are used, i.e., less than 1% by weight. If microcomposites of metal silicide particles dispersed in a silicon nitride matrix are desired, large amounts of metal silicide can be used.

Small amounts (less than 1.0 wt. %) of the transition metal silicide can be used if the silicide phase is present as very small, well dispersed particles. When larger particles are used, or if the silicide particles are not well dispersed, substantially higher quantities of silicide will be required to produce the same results.

The powder mixture can additionally contain other ceramic or metal phases that do not interfere with the catalytic effect of the high metal content silicide upon the glassy grain boundary phases. Such additives include, for example, titanium carbide, titanium nitride and zirconium oxide.

In a typical powder formulation process, the silicon nitride powder is milled along with the silicate-forming sintering aid. When transition metal, metal silicide or insoluble metal compound powders are used, they are milled with the silicon nitride powder before milling with the sintering aid. When soluble metal salts are used, they are added directly to an aqueous slurry of silicon nitride and sintering aid. Milling can be performed with any conventional equipment, such as, for example, ball mills, vibratory mills and attrition mills.

After milling, the slurry is dried, for example, by spray drying, and then mixed with the curable, liquid silicon nitride ceramic precursor binder. The powder mixture of silicon nitride, high metal content silicide (or a metal or metal compound capable of forming a high metal content silicide) plus the sintering aid comprises at least 40% and preferably at least 50% by volume of the nondilatant mixture. The percentage by weight will vary, depending on the density of the filler.

Processing aids such as dispersants, rheology modifiers and lubricants can also be added to the nondilatant mixture. When curing is to be accomplished by heating, the non-dilatant mixture can also include a free radical source, a curing agent or a catalyst, depending upon the type of silicon nitride precursor used.

The highly-filled, nondilatant mixtures are quite fluid at temperatures well below 80° C. and have a pour consistency similar to a thin syrup at temperatures as low as 60° C. at solids loadings of greater than 40 volume % powder. This contrasts with prior art injection molding mixes that typically have a putty-like consistency during molding.

With regard to the injection molder used in the practice of this invention, a ram extruder is preferred over a reciprocating screw extruder due to the rheological behavior of the mixtures used. The nondilatant mixture of powder and binder used in the practice of this invention has a sufficiently low viscosity at low temperatures to be extruded through an injection port into a mold at low pressures. In contrast, when reciprocating screw type injectors typically employed for conventional thermoplastic injection molding are used, the material flows up the screw flights rather than out of the nozzle into the mold. The pressure applied to the mix during injection is at least 50 psi and preferably between 100 and 2000 psi. The velocity of the ram is at least 1 inch per second (ips) and preferably between 3 and 10 ips. Excessively fast ram velocities are undesirable due to the jetting of the material into the mold cavity with subsequent formation of knit lines in the greenbody and degradation of the mechanical integrity of the sintered parts. Once filled, the mold pressure is held until the silicon nitride precursor cures. This holding pressure is at least 500 psi and preferably between 1000 and 4000 psi. Higher pressures are desired to minimize part shrinkage and cracking upon removal from the mold. The mold is held at a temperature high enough to initiate polymerization/crosslinking of the silicon nitride precursor. For example, when a dicumyl peroxide initiator is used to crosslink a vinylsilyl group in a precursor binder, the mold temperature is generally set at 150° C. Other initiators require different temperatures. When a free radical initiator is used, a temperature is generally selected so that the hold time in the mold is greater than or equal to one or preferably two half lives of the initiator at that temperature. It is important for the part to cure sufficiently while in the mold so that removal stresses can be sustained without cracking of the molded part. The mold should be fabricated in such a manner that the facile flow of the highly filled, nondilatant mixtures can be accommodated without leaking, since the mixtures are generally highly fluid at temperatures just below their cure temperature. The material used to fabricate the mold should be selected so that there is low adhesion of the cured part to the surface of the mold. This facilitates part removal. The exact nature of the material used to fabricate the mold depends on the composition of the mix to be injection molded and is readily apparent to one skilled in the art.

After curing of the silicon nitride ceramic precursor, the shaped article is heated under a suitable atmosphere to convert the precursor to silicon nitride, and then sintered to the desired density. Suitable sintering techniques include, for example, hot isostatic pressing or pressureless sintering. Sintering, densification, and glass crystallization can be carried out at 1300° to 1800° C. in a continuous, one-step heating process by varying the temperature and atmosphere during the sintering step. Heating to effect the formation of the silicate glass is preferably accomplished in an inert or reducing atmosphere. Typical are argon-, nitrogen- and ammonia-containing atmospheres. A nitrogen atmosphere is preferred. Heating to effect deoxygenation and crystallization of the silicate glass grain boundary phase catalyzed by the high metal content silicide is accomplished in a vacuum atmosphere. The process is accompanied by the evolution of silicon monoxide (SiO), which is a gas above 1300° C. at the processing pressures used. Vacuum is defined as any pressure lower than atmospheric. The extent of deoxygenation can be controlled by the temperature and time at temperature, as well as by the level of vacuum applied. The vacuum environment serves three purposes: (1) it eliminates residual oxygen activity in the process atmosphere, (2) it promotes the formation of SiO in the composition, rather than $SiO_2$, and (3) it rapidly removes the gaseous SiO from the ceramic as it is evolved.

Alternatively, the shaped article can be sintered in a two-step process, with or without full densification, by first heating to a temperature of 1300° to 1800° C. without application of a vacuum. The sintered ceramic comprises (1) from about 20% to about 98% silicon nitride, (2) from 0.5% to about 20% of a silicate glass, and (3) from 0.001% to about 80% of a high metal content silicide, all percentages being by weight based on the total weight of the composition. Reheating the sintered ceramic in a second step under vacuum at a temperature above 1300° C. will then produce deoxygenation and crystallization of the silicate phase. A two-step sintering process is preferred since it allows for more careful control of the processing environment.

It is believed that the metal silicide is oxidized to form free metal and gaseous SiO when a vacuum is applied to the sintered ceramic at a temperature above 1300° C. The free metal subsequently reacts with additional silicon nitride in the composition to reform the high metal content silicide with concurrent release of nitrogen gas as the reaction by-product. These reactions continue until enough of the reactive oxygen in the silicate glass phase is removed as SiO so that the silicate phase crystallizes. The result is thus a silicon nitride ceramic that can be completely devoid of glassy silicate phases. However, full depletion of reactive oxygen from the ceramic is possible only if no additional oxygen is available to the ceramic during processing. For example, if oxygen gas is present as a trace impurity in an inert process gas, reactive oxygen will remain in the ceramic. A level of even one part per billion oxygen impurity is a substantial quantity when there is a continuous gas flow during processing.

The following analytical procedures were used for Examples 3 and 4. Bulk densities were obtained either geometrically or by the Archimedes principle. Fracture surfaces were coated with a thin (2–5 nm) sputtered layer of gold/palladium. The surfaces were than analyzed in a scanning electron microscope (SEM) (Hitachi S-4000) at magnifications up to 100,000 X. Crystallographic content was determined by X-ray diffraction.

EXAMPLE A

Poly(methylvinyl)silazane was prepared as follows. A 5 liter, three-necked flask was equipped with an overhead mechanical stirrer, a dry ice/acetone condenser (−78° C.), an ammonia/nitrogen inlet tube and a thermometer. The apparatus was sparged with nitrogen and then charged with hexane (1760 ml, dried over 4 A molecular sieves), methyldichlorosilane (209 ml, 230.9 g, 2.0 mol) and vinylmethyldichlorosilane (64 ml, 69.6 g, 0.5 mol). The ammonia was added at a rate of 3.5 l/min (9.37 mol) for one hour. During the addition, the temperature of the reaction rose from 25° C. to 69° C. After one hour, the ammonia flow was stopped and the reaction mixture was filtered on a glass-fritted funnel to remove the precipitated ammonium chloride. The hexane was removed from the filtrate under reduced pressure (28 mm Hg, 60° C.) to give $(CH_3SiHNH)_{0.8}(CH_3SiCH=CH_2NH)_{0.2}$ as a clear oil (150.76 g, 2.34 mol, 94% yield). The oil had a viscosity of 43 centipoise at 25° C. and a molecular weight of 560 g/mol.

EXAMPLE B

Poly(methylvinyl)ureasilazane was prepared as follows. A 100 ml one-necked flask was equipped with a stir bar and septum and sparged with nitrogen. The flask was then charged with poly(methylvinyl)silazane prepared as described in Example A and 0.1 wt. % of phenylisocyanate. The reaction apparatus was placed in an oil bath on a stirrer/hot plate and the septum was replaced with a water condenser topped with a septum. A nitrogen inlet needle and oil bubbler outlet were placed in the septum. The reaction mixture was heated at 110° C. for 20 hours. A yellow oil having a viscosity of 1298 centipoise was produced.

EXAMPLE 1

A Ross double planetary mixer (Model LDM ™ 2) was charged with a mixture of 440.0 g of poly(methylvinyl)silazane prepared as described in Example A, 2.2 g of DiCup® dicumyl peroxide, 60.0 g Mazol®-300K glycerol monooleate, 150.0 g of cobalt metal powder, 40.5 g of aluminum oxide, 81.5 g of yttrium oxide, and 1228.5 g of silicon nitride powder. The mixer was heated to 50° C. and the mixture was compounded for one hour under a static vacuum. A smooth, flowable reaction injection molding blend resulted. The powder/polymer blend was injection molded into a 1"×5"×¼" cavity mold at 50° C. using a 25 ton Hull injection molder at a mold temperature of 150° C. and a ram pressure of 1000 psi. The part was demolded after curing in the mold for a period of 1 minute. The cured bar was exceptionally strong and tough. The green part was then pressureless sintered as follows. The bar was first heated in a nitrogen atmosphere to a temperature of 1750° C. at a heating rate of 10° C./minute and held at 1750° C. for four hours. The resulting sintered bar had a bulk density of 3.09 g/cc. Substantial quantities of silicate glass were detected in the bar when examined using SEM. The bar was then reheated under vacuum at 10° C./minute to a temperature of 1400° C. for a period of 3 hours. SiO evolution was observed. The resulting material had a bulk density of 3.24 g/cc. SEM analysis at 100,000 X confirmed a sintered microstructure and the presence of glass-free grain boundaries.

EXAMPLE 2

A Ross double planetary mixer (Model LDM#2) was charged with a mixture of 440.0 g of poly(methylvinyl)ureasilazane prepared as described in Example B, 2.2 g of DiCup® dicumyl peroxide, 60.0 g Mazol®-300K glycerol monooleate, 2.0 g of iridium metal powder, 40.5 g of aluminum oxide, 81.5 g of yttrium oxide, and 1365.0 g of silicon nitride powder. The mixer was heated to 50° C. and the mixture was compounded for one hour under a static vacuum. A smooth, flowable reaction injection molding blend resulted. The powder/polymer blend was injection molded into a 1"×5"×]" cavity mold at 50° C. using a 25 ton Hull injection molder at a mold temperature of 50° C. and a ram pressure of 1000 psi. The part was demolded after curing in the mold for a period of 1 minute. The cured bar was exceptionally strong and tough. The green part was then pressureless sintered as follows. The bar was first heated in a vacuum atmosphere to a temperature of 1750° C. at a heating rate of 10° C./minute and held at 1750° C. for four hours. SiO evolution was observed. SEM analysis at 100,000 X confirmed a sintered microstructure and the presence of glass-free grain boundaries.

We claim:

1. A reaction injection molding process for preparing a sintered, silicon nitride-containing ceramic article comprising:
    (1) injecting into a heated mold a fluid, nondilatant mixture comprising (a) at least 40% by volume of a powder mixture of (i) from about 20 wt. % to about 98 wt. % silicon nitride, (ii) from about 0.5 wt. % to about 20 wt. % of a silicate glass-forming sintering aid, and (iii) from about 0.001 wt. % to about 80 wt. % of a high metal content transition metal silicide or a transition metal or metal compound that forms a high metal content silicide with silicon nitride under the conditions defined in steps (2) or (3), and (b) a curable silicon nitride precursor binder that is a liquid below its curing temperature, to cure the binder and produce a hardened molded article,
    (2) heating the hardened mol suitable atmosphere to a temperature sufficient to convert the cured binder to a silicon nitride-containing ceramic, and
    (3) sintering the article by (i) heating at a temperature of 1300° to 1800° C. until a silicate glass forms, and (ii) further heating at a temperature of 1300° to 1800° C. under a vacuum until oxygen is removed from the silicate glass and the glass crystallizes.

2. The process of claim 1 wherein the silicon nitride precursor is a polysilazane.

3. The process of claim 1 wherein the silicon nitride precursor is a polyureasilazane.

4. The process of claim 1 wherein the silicon nitride precursor is an oligomer.

5. The process of claim 1 wherein the silicon nitride precursor contains sites of organounsaturation.

6. The process of claim 5 wherein said sites of organounsaturation are vinyl groups bonded to silicon.

7. The process of claim 5 wherein the nondilatant mixture further comprises a free radical initiator, and curing is effected by a free radical-initiated chemical polymerization or crosslinking through the sites of organounsaturation.

8. The process of claim 1 wherein the metal silicide is present in an amount of 0.001% to 1%.

9. The process of claim 1 wherein the metal silicide is present in an amount of 0.001% to about 40%.

10. The process of claim 1 wherein the sintering aid is a combination of aluminum oxide and yttrium oxide.

11. The process of claim 1 wherein the high metal content silicide is a silicide of Fe, Ru, Os, Co, Rh, Ir, Ni, Pd or Pt.

12. The process of claim 11 wherein the high metal content silicide is a silicide of Co, Rh or Ir.

13. The process of claim 1 wherein the nondilatant mixture is injected at a temperature of less than about 80° C.

14. The process of claim 13 wherein the temperature is less than about 60° C.

15. The process of claim 1 wherein the nondilatant mixture further comprises a dispersant.

* * * * *